J. E. WOOLVERTON.
Motive-Power.
No. 206,062. Patented July 16, 1878.
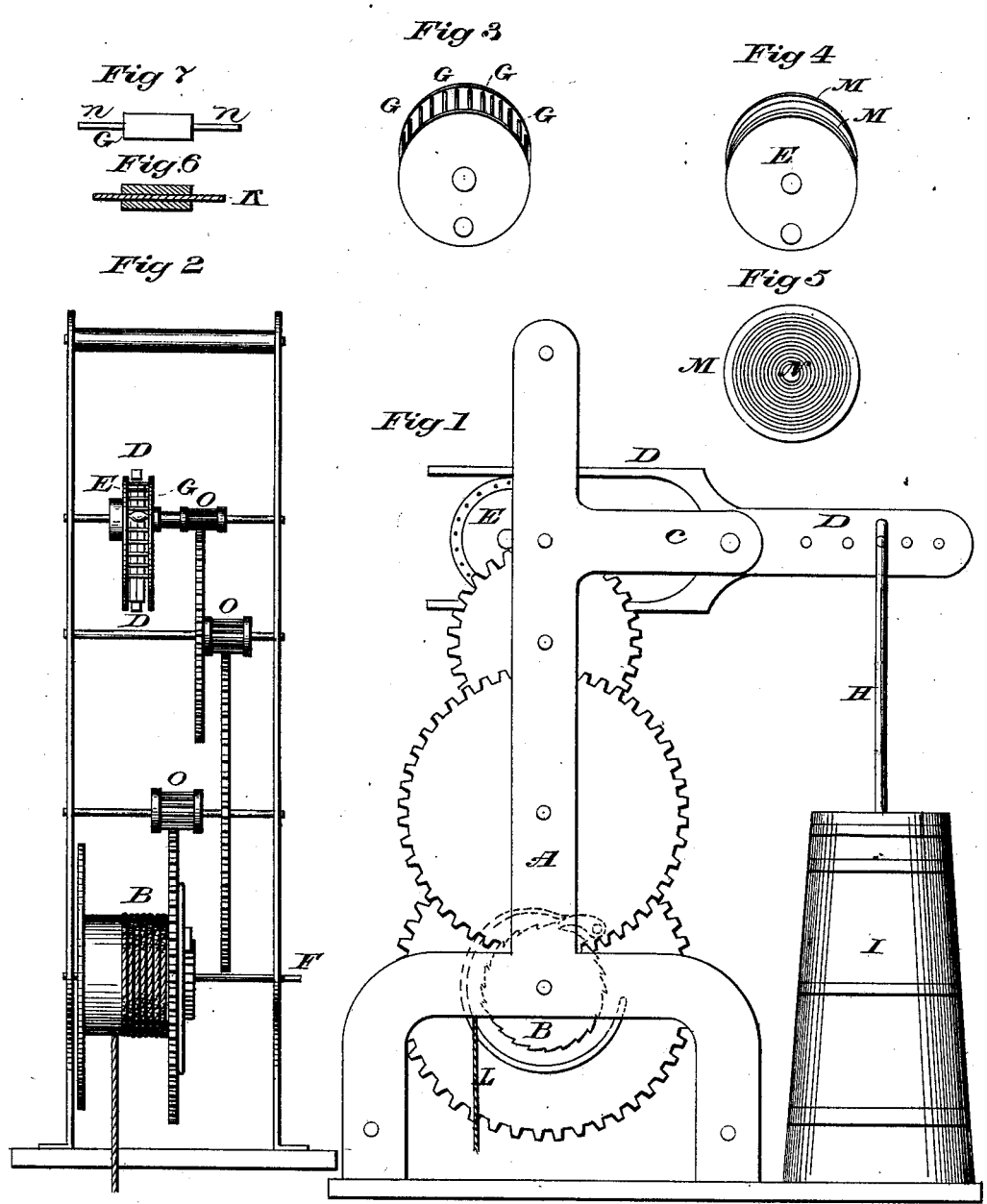

UNITED STATES PATENT OFFICE.

JOHN E. WOOLVERTON, OF INDIANAPOLIS, INDIANA, ASSIGNOR OF ONE-HALF HIS RIGHT TO DARWIN DE WOLF, OF CHATTANOOGA, TENN.

IMPROVEMENT IN MOTIVE POWERS.

Specification forming part of Letters Patent No. 206,062, dated July 16, 1878; application filed May 4, 1878.

*To all whom it may concern:*

Be it known that I, JOHN E. WOOLVERTON, of Indianapolis, in the county of Marion and State of Indiana, have invented a new and useful Improvement in Motive Powers, which is fully set forth in the following specification and drawings, in which—

Figure 1 is a side-elevation view, showing three cog-wheels and an eccentric geared together, and a forked lever connected with a churn, which represents one of the uses and purposes to which it may be applied.

I do not particularly confine myself to this use alone, for it may be applied and is equally adapted to a rocking churn, a rocking-cradle, a rocking-chair, fly-fans for tables, &c., peanut and coffee roasters, swings, sewing-machines, pumps, clocks, watches, and various other purposes.

Fig. 2 is a rear-elevation view, showing the spool upon which the weight is wound, and the pinions, also the small horizontal rollers in an eccentric. Fig. 3 is a perspective view, showing small horizontal rollers within the eccentric. Fig. 4 is also a perspective view of the eccentric, showing three wheels or rollers, which revolve on a pivot or axis in the center of said eccentric, which is in contact with the forked lever D. Fig. 5 is a side view of one of the wheels or anti-friction rollers of the eccentric, as shown in Fig. 4. Fig. 6 is a small anti-friction sleeve-roller and a shaft, upon which it revolves. Fig. 7 is a solid anti-friction roller, with small pivots *n n* upon each end to lessen friction.

The object of my invention is to furnish an economical power.

In the drawings, A represents a frame-work, made of any substantial material. B is a ratchet-wheel, with a spring to prevent the cord from unwinding without imparting motion to the gear-wheels; E, the eccentric, and D the lever. Said lever is forked, with any number of holes, to regulate the length of stroke, and is supported upon an axis, which receives the impulse of the eccentric E as it revolves upon its axis. C is an armed support for lever D and a part of frame-work A. The eccentric is fitted with anti-friction rollers G or M. F is the main arbor, with the end projecting, fitted square or otherwise to receive a crank, key, or lever for winding the weight or spring. G are anti-friction rollers. H is a churn-dasher. I is a churn. K is a small shaft. L is a rope to support the weight. M are wheels or anti-friction rollers, which revolve on a pivot in the center of the eccentric.

The operation of my machine is as follows: I wind up the weight-cord L and set the machine in motion. Power is thereby imparted from the gear-wheels to the eccentric E, giving a regulated motion through the lever D to the churn-dash H.

Having thus described my invention, what I claim as new, and desire to secure by Letters Patent, is—

1. The eccentric E, with rollers G, as shown and described.
2. The eccentric E, with rollers M, as shown and described.
3. The eccentric E, in combination with forked lever D, as shown and described.
4. The combination of the gearing and churn, as shown and described.

JOHN E. WOOLVERTON.

Witnesses:
F. M. SOPER,
JOHN B. DHONT.